June 7, 1938.   C. V. LITTON   2,119,955
VACUUM TIGHT POWER TRANSMISSION DEVICE
Filed June 4, 1936   2 Sheets-Sheet 1

Inventor
CHARLES V. LITTON
by Elmer J. Grun
Attorney

June 7, 1938. C. V. LITTON 2,119,955
VACUUM TIGHT POWER TRANSMISSION DEVICE
Filed June 4, 1936 2 Sheets-Sheet 2
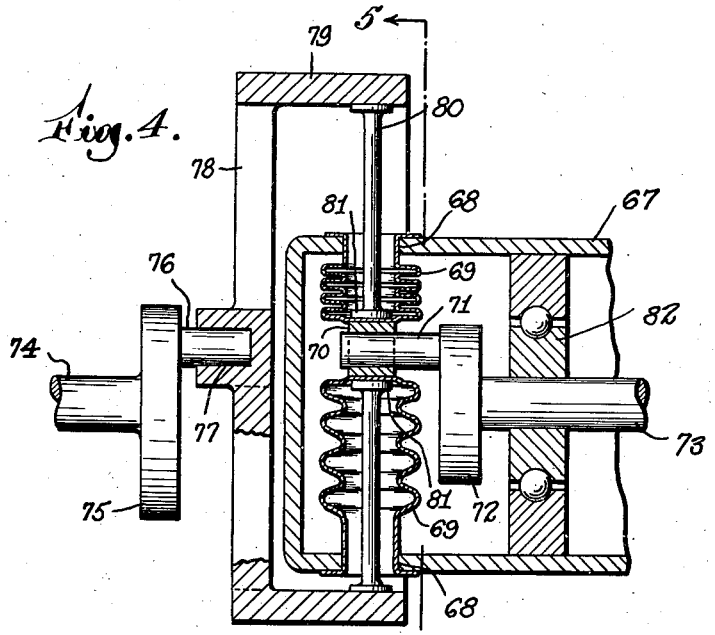
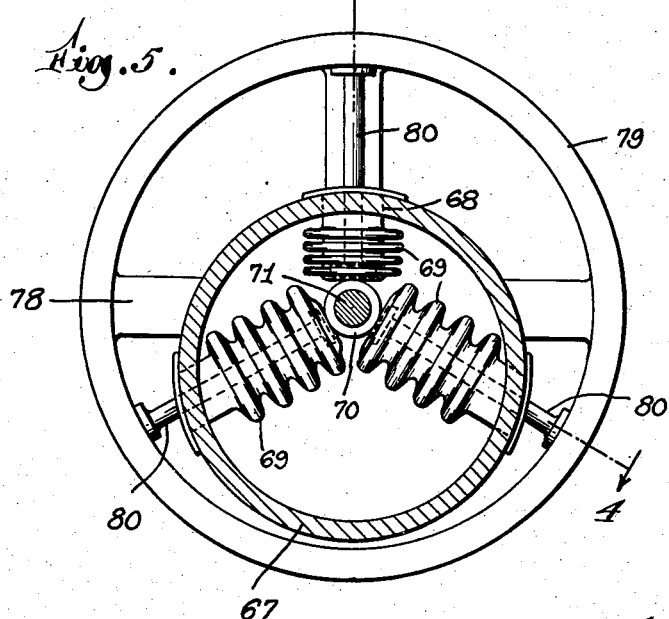
Inventor
CHARLES V. LITTON
by Elmer J. Gorn
Attorney Patented June 7, 1938

2,119,955

UNITED STATES PATENT OFFICE 2,119,955

VACUUM-TIGHT POWER TRANSMISSION DEVICE

Charles V. Litton, Redwood City, Calif.

Application June 4, 1936, Serial No. 83,467

3 Claims. (Cl. 286—29)

This invention relates to vacuum-tight power transmission devices in which power from an external driving member can be transmitted to the interior of a hermetically-sealed vessel without disturbing the hermetic seal.

One of the objects of my invention is to produce such devices which are simple to construct and durable in operation.

Another object of my invention is to produce such devices in which a driving rotary movement is converted into a simple flexing movement of a flexible diaphragm, and is reconverted into a rotary driven movement within a hermetically-sealed chamber.

The foregoing and other objects of my invention will be best understood from the following description of exemplifications thereof, reference being had to the accompanying drawings, wherein:

Fig. 4 is a cross-sectional view of an additional embodiment of my invention; and Fig. 5 is a cross-sectional view taken along line 9—9 of Fig. 4.

Figure 1:
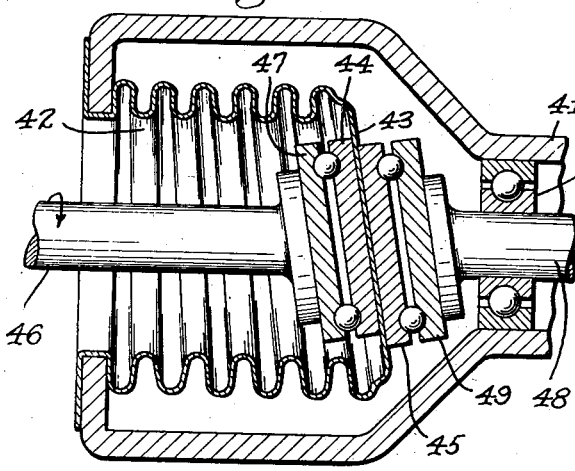
Fig. 1 is a cross-sectional view of one embodiment of my invention.

In power transmission devices in which the driven element is contained within a sealed chamber which, for example, may be a vacuum chamber or a chamber filled with fluids of various kinds under various pressures, the problem arises of transmitting power from some external source to the driven member without destroying the hermetic seal. I have found that this problem can be solved by providing as part of the wall of the sealed chamber a flexible diaphragm such as, for example, a "Sylphon" bellows of suitable material, converting the driving motion into a simple flexing motion of the diaphragm wall, and reconverting this flexing motion to a driven motion within the sealed chamber. In the drawings I have illustrated a number of embodiments of my invention, each incorporating this idea.

A "Sylphon" bellows possesses a flexibility enabling the end wall thereof to be subjected to a considerable rocking action. This degree of flexibility may be utilized in an arrangement such as is shown, for example, in Fig. 1. In this figure a wall 41 of a sealed chamber has sealed in an opening therein a "Sylphon" bellows 42. This "Sylphon" bellows is provided with a flat end 43 of relatively extended area. To one side of the end 43 is rigidly secured a stationary ball-bearing race 44. To the other side of the end 43 is rigidly connected a stationary ball-bearing race 45. A driving shaft 46 extends within the "Sylphon" bellows 42, and has rigidly connected to the end thereof at an angle thereto, as illustrated in Fig. 1, a ball-bearing race 47 adapted to cooperate with the race 44. In a corelative manner a driven shaft 48 within the sealed chamber has rigidly connected to the end thereof at an angle thereto, a ball-bearing race 49 adapted to cooperate with the race 45. Suitable bearing balls are located between the races 44, 47 and 45, 49, respectively. The driven shaft 48 may be supported in a suitable bearing 50 carried by the wall 41 of the sealed chamber.

As the driving member 46 is rotated, the bottom wall 43 of the "Sylphon" bellows 42 is tilted back and forth so as to compress one side of the "Sylphon" bellows 42 and extend the other side thereof alternately. This tilting motion is transmitted to the stationary race 45, which tilting motion is in turn converted into a rotary motion of the driven shaft 48, due to the angular relationship between the race 49 and the driven shaft 48. In this way considerable driving power can be transmitted between the driving shaft 46 and the driven shaft 48.

In the arrangement shown in Fig. 1, a considerable thrust will be exerted against the end of the driven shaft 48. This thrust, however, can be readily compensated for by properly designing bearings which are preferably carried from the wall 41 of the sealed chamber.

A "Sylphon" bellows has additional flexibilities to that heretofore discussed, which enable power to be transmitted therethrough. For example, a "Sylphon" bellows can be elongated and compressed with a considerable degree of motion. This degree of flexibility may be utilized in an arrangement such as is shown, for example, in Figs. 2 and 3. In these figures, a wall 51 of a sealed chamber is provided with an end plate 52 having three openings 53 located therein and preferably spaced from each other 120° apart. In each of these openings 53 is sealed a "Sylphon" bellows 54, each of which is capable of compression and expansion with a substantial travel of the end thereof. Through the end of each "Sylphon" bellows 54 and rigidly connected thereto is sealed a thrust rod 55. The outer end of each thrust rod 55 is pivotally connected to the plate 56 which acts as one race for a series of bearing balls 57. The other end of each thrust rod 55 is pivotally connected to a similar plate

Figure 2:
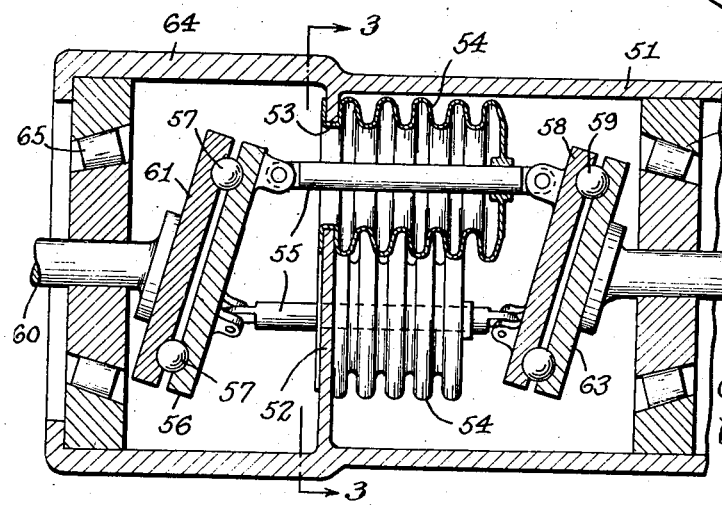
Fig. 2 is a cross-sectional view of another embodiment of my invention.

58, serving as one race for a series of bearing balls 59. One end of a driving shaft 60 carries a plate 61 rigidly connected thereto at an angle, as shown in Fig. 2. This plate is adapted to serve as the other race for the bearing balls 57. Conversely, a driven shaft 62 has rigidly connected to one end thereof at an angle thereto a plate 63 which is adapted to serve as the other race for the bearing balls 59. The wall 51 may be provided external to the seal thereof with an extension 64. This extension carries a suitable thrust bearing 65 in which the shaft 60 may rotate. Likewise carried by the wall 51 within the sealed portion of the chamber is a suitable thrust bearing 66 in which the driven shaft 62 may rotate.

When the driving shaft 60 is rotated, its rotary motion is converted into a rocking motion of the plate 56. This rocking motion imparts to the thrust rods 55 a substantially reciprocating motion which alternately elongates and compresses the "Sylphon" bellows 54. This substantially reciprocating motion is reconverted into a rocking motion of the plate 58, which in turn is converted into a rotary motion of the shaft 62, due to the angular relationship of the plate 63 with respect to said shaft 62.

Figure 3:
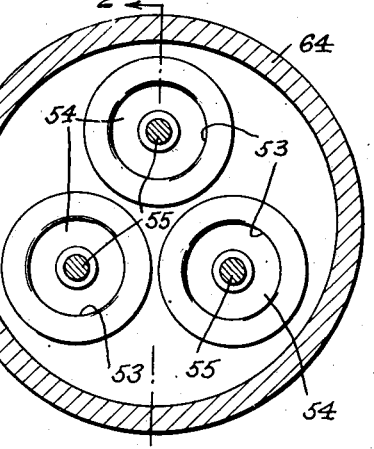
Fig. 3 is a cross-section taken along line 7—7 of Fig. 2.

The degree of flexibility utilized in the arrangement as shown in Figs. 2 and 3 may be utilized in a number of different ways. For example, Figs. 4 and 5 show an additional embodiment utilizing this degree of flexibility of the "Sylphon" bellows. In these figures a cylindrical wall 67 of a sealed chamber has three openings 68 located around the circumference thereof substantially 120° apart. In each of these openings is sealed a "Sylphon" bellows 69 extending into the interior of the cylindrical portion formed by the wall 67. The end of each of the "Sylphon" bellows 69 is rigidly connected to a circular bearing ring 70. The circular bearing ring 70 receives a pin 71 eccentrically mounted in a crank 72 which in turn is mounted on the end of a driven shaft 73 within the sealed chamber.

A driving shaft 74 is provided for the purpose of providing a driving force to the driven shaft 73. In order to transmit this power, the driving shaft 74 is provided with a crank 75 which has eccentrically mounted thereon a crank pin 76 which is received in a bearing recess 77 mounted at the center of a driving frame 78. The driving frame 78 has an extension 79 which extends over the end of the cylindrical wall member 67 to such an extent that thrust rods 80 rigidly connected to the extension 79 may extend into each of the "Sylphon" bellows 69. The inner end of each of the thrust rods 80 may be provided with a thrust foot 81 which pushes against the end wall of each "Sylphon" bellows 69. The driven shaft 73 may be suitably mounted in a bearing 82 carried by the wall 67.

When the driven shaft 74 is rotated, the crank 75 through the intermediary of the pin 76 imparts to the driving frame 78 an oscillatory circular motion. This motion is converted into a substantially reciprocating motion of each of the thrust rods 80. The thrust which is exerted by each of the rods 80 bears such a phase relation to the thrust exerted by each of the other rods 80 that the resultant of these thrusts produces a force which progresses in a circular direction around the axis of the driven shaft 73. In this way there is imparted to the bearing ring 70 such a circular motion. This is in turn imparted to the crank 72 through the medium of the pin 71, and in this way a rotating driving force is imparted to the driven shaft 73. In this manner a considerable amount of power can be transmitted between the shafts 74 and 73 without destroying the hermetic seal. It will be noted that during this motion the "Sylphon" bellows are merely extended and compressed without these bellows in themselves carrying any considerable amount of power.

This invention is not limited to the particular details of construction as described above inasmuch as most of the illustrations are given in diagrammatic form. Various equivalents of many of the features described will suggest themselves to those skilled in the art. It is accordingly desired that the appended claims be given a broad interpretation commensurate with the scope of the invention within the art.

What is claimed is:

1. A power transmission device comprising a hermetically-sealed chamber, an opening in a wall of said chamber, a flexible imperforate diaphragm sealing said opening, a rotatable driving member external to said chamber, a driven member within said chamber, tiltable rigid transmission means nonrotatably engaging said diaphragm over a substantial wall portion thereof and extending beyond the point of engagement with said diaphragm both within and without said chamber, said transmission means being arranged to tilt about a substantially fixed point lying substantially along the axis of said driving member, means coupling said driving member to said transmission means for converting the rotary motion of said driving member into a tilting motion of said transmission means, thus subjecting said diaphragm to a tilting flexing motion, and means coupling said transmission means to said driven means for converting the motion of said transmission means into a rotating motion of said driven means.

2. A power transmission device comprising a hermetically-sealed chamber, an opening in a wall of said chamber, a flexible imperforate diaphragm sealing said opening, a rotatable driving member external to said chamber, a driven member within said chamber and adapted to be rotated, tiltable rigid transmission means non-rotatably engaging said diaphragm over a substantial wall portion thereof and extending beyond the point of engagement with said diaphragm both within and without said chamber, said transmission means being arranged to tilt about a substantially fixed point lying substantially along the axis of said driving member, an extended thrust member rigidly mounted on said driving member at an angle to the axis of rotation of said driving member, a co-operating thrust member comprising part of said transmission means, bearing surfaces located between said thrust members permitting rotation of said first thrust member with respect to said second thrust member whereby rotation of said driving member is converted into a tilting motion of said transmission means and a consequent tilting flexing motion of said diaphragm, an extended thrust member rigidly mounted on said driven member at an angle to the axis of rotation of said driven member, a cooperating thrust member comprising part of said transmission means, bearing surfaces located between said latter two thrust members permitting relative rotation between said thrust members, whereby the tilting motion of said transmission means is converted into a rotating motion of said driven member.

3. A power transmission device comprising a hermetically-sealed chamber, a plurality of openings in the wall of said chamber, a flexible imperforate bellows sealing each of said openings, a rotatable driving member external to said chamber, a driven member within said chamber and adapted to be rotated, transmission means coupling said driving member to said driven member comprising a plurality of thrust rods each engaging one of said bellows, means for converting the rotary motion of said driving means into a substantially reciprocating motion of said thrust rods, whereby each bellows is alternately compressed and extended, means coupling each of said bellows to said driven member, said thrust rods being arranged to move in such phase relation to each other to give to said coupling means a resultant rotary driving force, whereby said driving force is transferred to said driven member to produce rotation thereof.

CHARLES V. LITTON.